E. A. EMERY.
LUBRICATOR FOR PNEUMATIC APPARATUS.
APPLICATION FILED AUG. 5, 1909.
1,099,242.
Patented June 9, 1914.
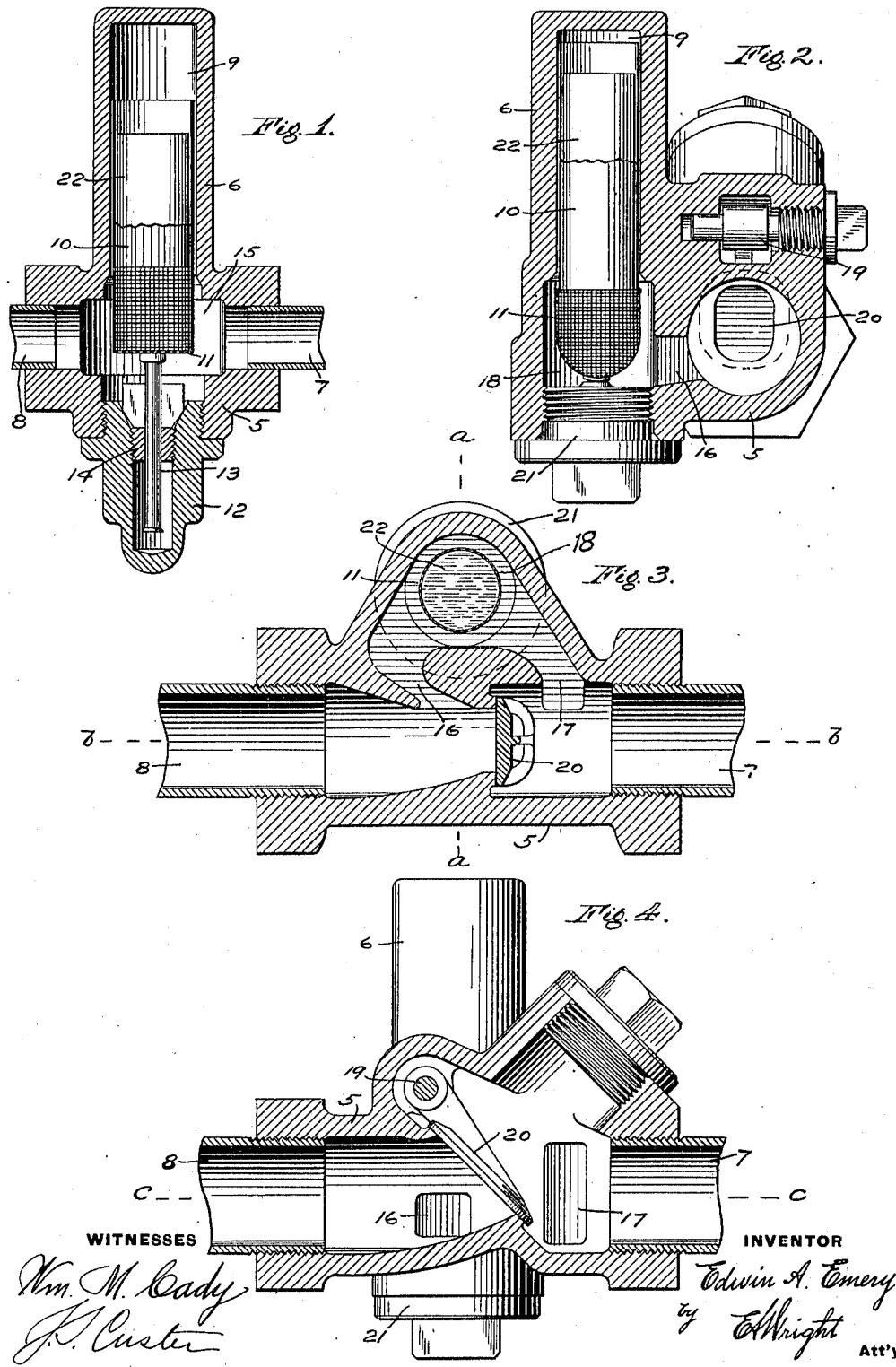

UNITED STATES PATENT OFFICE.

EDWIN A. EMERY, OF DENVER, COLORADO, ASSIGNOR TO THE EMERY PNEUMATIC LUBRICATOR COMPANY, A CORPORATION OF COLORADO.

LUBRICATOR FOR PNEUMATIC APPARATUS.

1,099,242.

Specification of Letters Patent.

Patented June 9, 1914.

Application filed August 5, 1909. Serial No. 511,431.

*To all whom it may concern:*

Be it known that I, EDWIN A. EMERY, a citizen of the United States, residing at Denver, in the county of Denver and State of Colorado, have invented new and useful Improvements in Lubricators for Pneumatic Apparatus, of which the following is a specification.

This invention relates to lubricators for pneumatic machinery and particularly to apparatus operated by compressed air wherein the lubricant is exposed in or adjacent to the current of compressed air to be dissolved by the moisture contained therein and conveyed thereby to the parts to be lubricated, as set forth in my prior Patents 827518 and 827519 of July 31, 1906.

My present invention has for one of its objects to provide an improved device for containing the lubricant to be used by this method, which device shall be of simple and durable construction, efficient in operation, easily adjusted and economical in the use of lubricant.

Another feature of my present improvement relates more particularly to lubricators for air brake apparatus having quick action triple valves in which there is at certain times a sudden and violent action of the air under pressure due to the rapid venting of air from the train brake pipe in emergency applications of the brakes. It has been found in some instances that this violent action of the air under pressure has produced an excessive erosion upon the stick of lubricant located directly in the path of such rapid flow of air, and one object of this invention is to provide means whereby this sudden and rapid flow of air may take place through a passage out of contact with the lubricant which is however exposed to the action of the air currents in all of the more gradual variations in pressure such as occur in all ordinary service applications.

In the accompanying drawing Figure 1 is a vertical section showing one form of lubricator embodying my improvements; Fig. 2 a vertical transverse section taken on line *a—a* of Fig. 3 and showing a modification adapted for use in connection with quick action triple valves in air brake apparatus; Fig. 3 a horizontal section taken on the line *c—c* of Fig. 4; and Fig. 4 a vertical section taken on the line *b—b* of Fig. 3.

According to the construction shown in Fig. 1 the lubricator comprises a casing 5 having an air passage 15 with openings for pipe connections 7 and 8, and a lateral extension 6, preferably vertical, containing chamber 9 which communicates with air passage 15. The cage 10 is located in the chamber 9 and is adapted to hold the stick of lubricant 22, the lower end 11 of the cage being perforated and extending into the air passage 15 so as to expose a certain area of the lubricant to the action of the moisture in the current of compressed air which flows through the air chamber and the pipe connections. The cage 10 may be supported at any desired point by any preferred means and if desirable the support may be adjustable as, for instance, by means of the stem 13 and clamp nut 14 carried by the cap nut 12 which closes the opening in casing 5 through which the lubricant cage is inserted, the upper end of the nut 14 being split as indicated and adapted to clamp the stem 13 when screwed down into the cap nut.

According to the modification shown in Figs. 2, 3 and 4, the casing which is adapted to be attached to the pipe connections, contains a lightly weighted valve 20 normally closing a direct passage through the casing while a by-passage 16, 18, 17, is provided around said valve. As in the plain type lubricator above described, the cage 10 for holding the lubricant is located in chamber 9 of extension 6 of the casing and has a perforated lower end 11 which projects into the chamber or passage 18 through which the compressed air flows in all ordinary service applications and release of the brakes. The valve 20 is designed to swing upon a pivot 19 but any other suitable form of valve may be used if desired. As shown in this modification the lubricant cage is supported directly upon the plain cap nut 21 but it will be obvious that either the plain or the adjustable form of cap nut, as shown in Fig. 1, may be used in either type of lubricator as desired.

As employed in air brake apparatus the lubricator is usually connected in the branch pipe leading from the train brake pipe to the triple valve mechanism of the car brake equipment, the plain type as shown in Fig. 1, being adapted for use with plain triple valves and also in other locations in a locomotive brake equipment as well as with other forms of pneumatic machinery wherein the flow of compressed air is not so rapid or violent as to cause an excessive erosion or disintegration of the lubricant.

The form of lubricator having the check valve is adapted to be used with the usual car brake apparatus having a quick action triple valve and the lubricator is so connected that the check valve may open toward the triple valve for the purpose of permitting the rapid flow of compressed air due to the opening of the emergency valve and the sudden venting of the train pipe in emergency application of the brakes as is well understood by all familiar with air brake apparatus.

During all ordinary service applications and releases of the brakes the flow of the compressed air through the branch pipe to and from the triple is more gradual and does not lift the valve 20 from its seat but flows through the by-passage around the perforated cage in which the lubricant is exposed to the action of the air current. In this manner the lubricant is slowly disintegrated and carried by the current of compressed air to the triple valve and other moving parts of the air brake or other mechanism which are thereby thoroughly cleansed and lubricated.

When an emergency application of the brakes is made, each triple valve operates in "quick action," opening a large brake pipe vent port and causing a great and sudden reduction in the branch pipe 7 so that the compressed air in the brake pipe on the opposite side of check valve 20 immediately opens the valve and flows with a rapid and violent action directly through the casing without subjecting the lubricant to excessive erosion.

As the lubricant is gradually eroded and disintegrated from the exposed portion at the bottom of the cage, the stick or charge automatically feeds downward by gravity and continues to furnish the necessary lubrication until the same is nearly or quite exhausted, at which time the cage may be removed through the opening which is normally closed by the cap nut. A fresh charge of lubricant is then inserted and the cage replaced in position.

Having now described my invention, what I claim as new and desire to secure by Letters Patent, is:—

1. A lubricator for compressed air apparatus, comprising a casing having an air passage and a vertical extension forming a chamber, a lubricant holding cage located in said chamber with its lower end perforated and projecting into the air passage, the casing having an opening in the bottom thereof opposite said extension for removing the cage, a cap for closing said opening, and means carried by the cap for supporting the cage.

2. A lubricator for compressed air apparatus, comprising a casing having a valve controlled-direct passage and an open by-passage, and means for holding a lubricant in said open passage to expose the same to the action of the compressed air flowing through said open passage.

3. A lubricator for compressed air apparatus, having a direct air passage with a valve for normally closing same, a by-passage around said valve, and means for holding a lubricant in said by-passage for exposing the same to the action of the current of compressed air.

4. A lubricator for air brake apparatus, having a direct passage with openings for connection with the brake pipe, a normally closed valve in said passage but adapted to open upon sudden variations in brake pipe pressure, a by-passage around said valve, and means for holding a lubricant in said passage for exposing the same to the action of the compressed air flowing through the brake pipe.

5. A lubricator for compressed air apparatus, having an air passage, a normally closed valve therein but adapted to open upon sudden variations in air pressure, a by-passage around said valve, and means for holding a lubricant in said by-passage to expose the same to the action of the current of compressed air.

6. A lubricator for compressed air apparatus, having an air passage, a normally closed valve therein but adapted to open upon sudden variations in air pressure, a by-passage around said valve, and a perforated cage for holding a lubricant in said by-passage.

7. A lubricator for compressed air apparatus, comprising a casing having a direct air passage containing a valve normally closed but adapted to open upon sudden variations in air pressure, a by-passage for the compressed air to normally flow around said valve, a chamber extending from said by-passage, and a perforated cage for holding a lubricant located in said chamber and projecting into the by-passage to expose the lubricant to the action of the current of compressed air.

In testimony whereof I have hereunto set my hand.

EDWIN A. EMERY.

Witnesses:
C. C. ZIEGLER,
B. E. ADREAN.

Copies of this patent may be obtained for five cents each, by addressing the "Commissioner of Patents, Washington, D. C."